No. 713,469. Patented Nov. 11, 1902.
G. G. MARTIN.
DENTISTRY.
(Application filed Mar. 18, 1902.)
(No Model.)

Fig. 4ª. 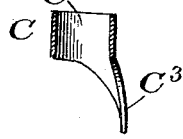

WITNESSES:
Jos. A. Ryan
Perry B. Turpin
INVENTOR
George G. Martin.
BY Munn & Co.
ATTORNEYS
THE NORRIS PETERS CO., PHOTO-LITHO., WASHINGTON, D. C.

UNITED STATES PATENT OFFICE.

GEORGE G. MARTIN, OF PECOS CITY, TEXAS.

DENTISTRY.

SPECIFICATION forming part of Letters Patent No. 713,469, dated November 11, 1902.

Application filed March 18, 1902. Serial No. 98,759. (No model.)

*To all whom it may concern:*

Be it known that I, GEORGE G. MARTIN, a citizen of the United States, residing at Pecos City, in the county of Reeves and State of Texas, have made certain new and useful Improvements in Dentistry, of which the following is a specification.

My invention is an improvement in dentistry, and has for a primary object to provide means whereby the natural teeth which have become loosened from any cause—such, for instance, as pyorrhea and Riggs disease—may be tightened and held in place in the jaw; and the invention consists in the improvements hereinafter described and claimed.

Figure 1:
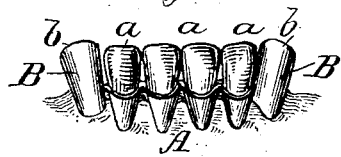
Figure 2:
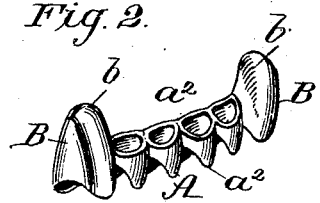
Figure 3:
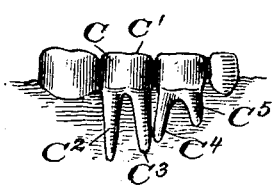
Figure 4:
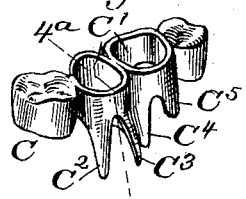
Figure 5:
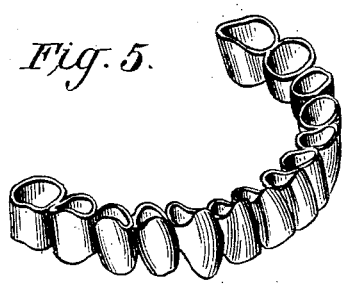
Figure 6:
Figure 7:
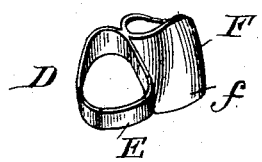

In the drawings, Figure 1 is a front elevation showing my invention applied to the lower front teeth. Fig. 2 is a detail perspective view of the anchorage device shown in Fig. 1. Fig. 3 is a side elevation showing the invention applied to four jaw-teeth. Fig. 4 is a detail perspective view of the anchorage device shown in Fig. 3. Fig. 4$^a$ is a detail cross-section on about line 4$^a$ 4$^a$ of Fig. 4. Fig. 5 is a detail perspective view of the anchorage device which may be used in anchoring the entire set of upper teeth. Fig. 6 is a detail perspective view showing three combined collars and crowns united together, and Fig. 7 is a detail perspective view showing the invention adapted to produce a gold edge for one of the teeth.

It is well known that from various causes the natural teeth become loose and the gums recede, exposing the roots of the teeth below the enamel, decay rapidly proceeds, and great inconvenience results. As the teeth occupy different angles, it is evident that if they be anchored rigidly together or unified, so they can only move together, the movement of the teeth in their sockets will be prevented and the teeth will be held rigidly and cannot be withdrawn, as in order to withdraw the teeth it will be necessary to pull each of same in the direction of its angle, and the angles of the different teeth being different they will all when held together be held rigidly in their sockets, and as the teeth will be held from movement in their sockets the irritation incident to the movement of the loose teeth in their sockets will be avoided and nature will set up her remedial processes and the disease will be crowded out. Thus it will be seen by my invention I provide for holding the loose teeth in fixed normal position by unifying them by means of a reciprocal anchorage between the several loose teeth or by means of anchoring a loose tooth or number of loose teeth to a fixed tooth in such manner as to prevent the independent movement of the several teeth. By thus unifying the teeth I hold them in the jaw and also from independent movement, and I secure this result, preferably, by means of collars fitted to their respective teeth, the several collars being united rigidly together to form a unifying-anchor, which is applied contemporaneously to the several teeth.

In Fig. 1 the invention is shown applied to the two lower cuspids and the teeth between the same. In this construction the collars A for the lower front teeth are designed to embrace the exposed roots of the teeth $a$, from which teeth the gums have receded and exposed the roots below the enameled portion of the teeth. When so applied, the collars A not only operate to anchor the teeth together to prevent their independent movement, but they also take the place of the gum which has receded and encircle and inclose the exposed portions of the roots and prevent any decay of the latter or any accumulation of tartar thereon. At the same time the collars A, being located around the roots of the teeth, are practically out of sight, as is desired. In this construction (shown in Figs. 1 and 2) the collars B for the cuspids are closed at the top at $b$, forming crowns. This may be desirable when the upper portions of the cuspids are decayed or broken off and also whenever it is desired to secure a firmer anchorage at the end or ends of the appliance. It will be noticed that by my invention I extend the collars to overlie the exposed portions of the roots of the teeth and to take the place of the gum which has receded. In applying my invention the teeth may be measured by means of a wire or other suitable means and the several collars fitted and applied to their respective teeth in the position they will occupy when the operation has been completed and the teeth anchored in place. An impression may then be taken in the manner usually practiced by dentists, the collars having been removed from the teeth and applied to the impression in the positions they occupied when upon the teeth, a cast being then taken and the collars soldered or otherwise rigidly united in the relative positions they occupied when on the teeth. Then when the appliance has been properly finished and polished it may be applied to the group of teeth, the latter having been properly prepared and cement employed to cover any inequalities and to aid in securing the anchorage device and closing all joints. When thus applied, the anchorage device will operate to hold the several teeth rigidly together and prevent any independent movement thereof, and so operate to secure the teeth from movement in their sockets and also to hold them in place in the jaw.

It sometimes happens that the teeth are defective at their upper portions as well as loosened by the receding of the gum, and in such case it may be desirable to extend the bands or collars to the outer ends of the teeth, as shown in Fig. 3, in which the invention is applied to the lower molars, and the collars C extend to the outer ends of the teeth, are open at their outer ends at C' to expose the natural crowns of the teeth, and are provided at their inner ends with prongs or extensions $C^2$, $C^3$, $C^4$, and $C^5$, which extend along the exposed portions of the roots of the teeth and protect the same by taking the place of the receded gum and also by inclosing the same in such manner as to prevent decay.

In Fig. 5 I show the anchorage device adapted to incase and connect all the teeth of the upper set, this being desirable when any or all of the teeth are loose and when the ends of the teeth are worn away, broken, or otherwise injured.

In Fig. 6 I show combined crowns and collars for three teeth anchored together to hold in rigid position, as will be understood from the said figure.

In Fig. 7 I show a construction whereby the collar D is formed at its front side E to conform at its edge to the normal edge of the tooth, the adjacent collar F being formed to provide a crown $f$ for the adjoining tooth.

From the foregoing it will be noticed that by my invention I provide for unifying the teeth (one or more of which may be loose) by means of a reciprocal anchorage which when applied to several loose teeth operates to hold them from independent movement because of the different angles in which the said teeth stand, as will be understood from the foregoing description.

It will be understood that in applying the anchoring-collars to the teeth the appliance is forced on until the edges of the collars enter the gums, forming a close joint.

Having thus described my invention, what I claim as new, and desire to secure by Letters Patent, is—

1. As a means for securing loose teeth and holding the same from movement, a series of connected collars adapted to fit around the adjacent teeth and forming embracing bushings around the tooth and extending beyond the normal line of the gum toward the apex of the root to anchor the teeth rigidly together whereby to prevent their independent movement substantially as set forth.

2. In a dental appliance a collar adapted to fit around a loose tooth and provided at its inner end with a spur-like extension toward the jaw-bone to overlie the portion of the tooth which has been exposed by the recession of the gum, and a collar on an adjacent tooth to which the said first collar is rigidly united, the two collars constituting a unifying-anchor consisting of a series of connected collars substantially as set forth.

3. A dental appliance comprising the end sections formed to fit over and around the opposite lower cuspids and the intermediate collars extending between the end sections and formed to fit around the lower front teeth and upon the portions thereof exposed by the recession of the gums substantially as set forth.

GEORGE G. MARTIN.

Witnesses:
SOLON C. KEMON,
PERRY B. TURPIN.